UNITED STATES PATENT OFFICE.

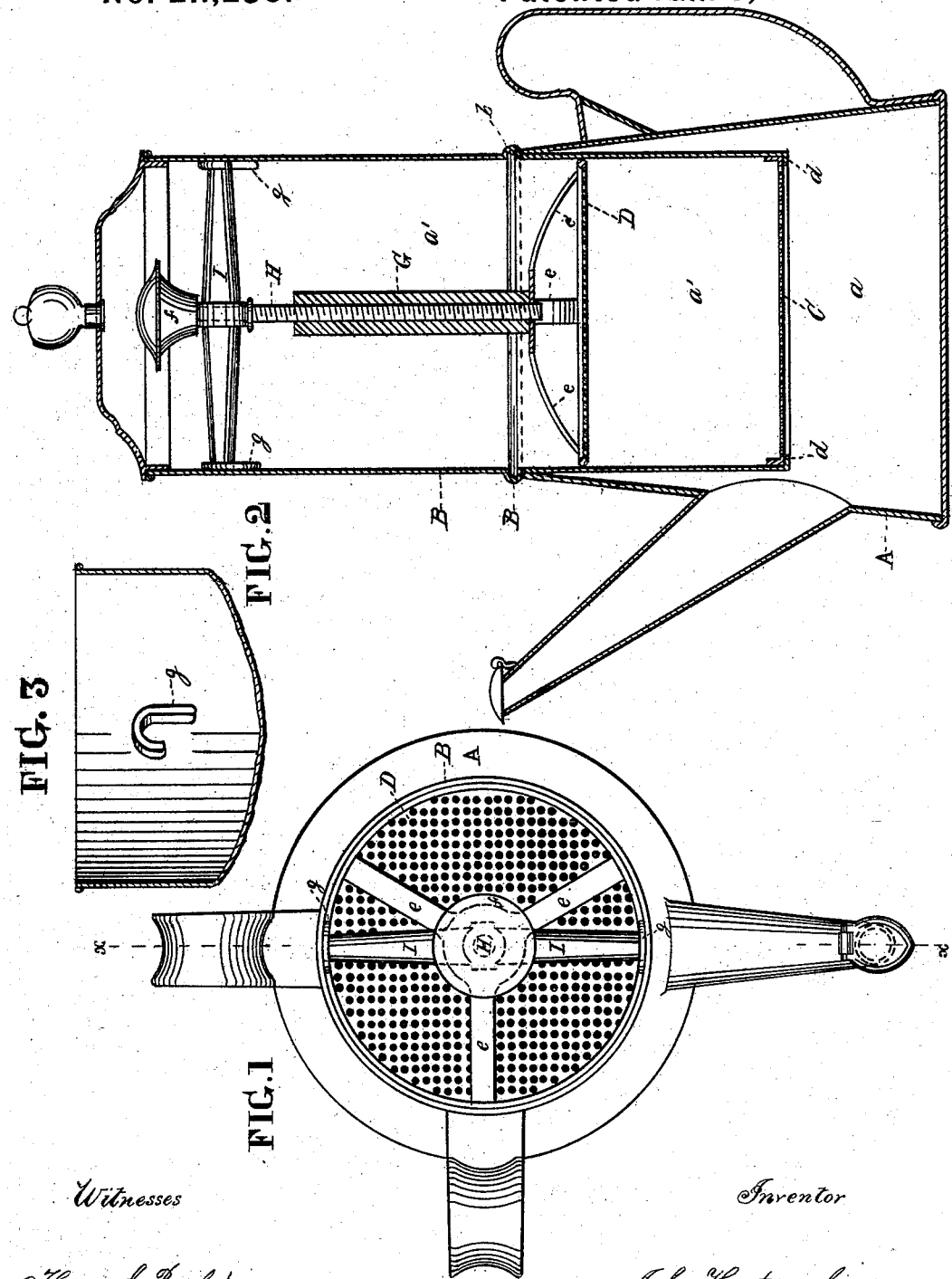

JOHN HARTMAN, JR., OF PHILADELPHIA, PENNSYLVANIA.

IMPROVEMENT IN COFFEE-POTS.

Specification forming part of Letters Patent No. 211,236, dated January 7, 1879; application filed January 5, 1878.

*To all whom it may concern:*

Be it known that I, JOHN HARTMAN, Jr., of the city and county of Philadelphia, in the State of Pennsylvania, have invented a new and useful Improvement in Coffee-Pots, which improvement is fully set forth in the following specification and the accompanying drawings, in which—

Figure 1 is a plan view of my improved coffee-pot, the cover being removed. Fig. 2 is a vertical section at the broken line $x\ x$ of Fig. 1. Fig. 3 is a section of an upper part of the detachable section B, showing one of the bearings $g$.

Like letters of reference in all the figures indicate the same parts.

My invention relates to that class of coffee-pots in which the ground coffee is placed in a decocting-chamber, above one which receives the decoction as it passes from the former chamber; and the nature of my invention consists in the combination of an adjustable perforated diaphragm, adjusting vertical screw-rod, and cross-bar (in which it turns freely, while its lower end, by a screw-connection with the diaphragm, adjusts the latter) with the decocting-chamber provided with a perforated loose bottom, as hereinafter more fully described.

In reference to the drawings, A represents the lower section of my improved coffee-pot, into which the decoction passes as it is formed in the upper and detachable section, B. The latter section is held in position by means of the annular bead $b$, which rests upon the upper edge of the section A, leaving below the perforated bottom C a chamber, $a$, in the lower section, of sufficient capacity to hold the maximum quantity of decoction that may at any time be made in the upper chamber, $a'$. The section B has an inwardly-projecting annular lip, $d$, upon which the perforated bottom C rests, which has a loose fit, so as to be readily detached for the purpose of cleaning it and the decocting-chamber $a'$.

D is a perforated diaphragm, adjustable in the chamber $a'$ to any desired height. It has a permanent spider, $e$, which is provided with a central vertical tube, G.

H is a vertical screw-rod, which works in a nut in the upper end of the tube G, for the adjustment of the diaphragm D. The upper end of the rod has a loose fit in the cross-bar I, so as to turn freely therein when manipulated by means of the knob $f$, the ends of the bar being placed in the bearings $g\ g$, in opposite sides of the section B. The bearings are made open below, as represented in Figs. 2 and 3, for conveniently removing and attaching the bar I.

Instead of the screw-rod H, a vertical rack or racks on the inner surface of the wall of the section B and pawls may be used, or any other suitable device for the adjustment of the diaphragm D.

The operation is as follows: The ground coffee is placed in the decocting-chamber $a'$, and the diaphragm D brought into its place, the adjusting screw-rod H having been previously screwed down, so as to conveniently connect the ends of the bar I with its bearings $g\ g$. Then the diaphragm is forced down upon the ground coffee by operating the screw-rod, and the proper amount of water for making the decoction is poured into the chamber $a'$, and passes through the perforated diaphragm and percolates through the coffee, whereby its essence is extracted, and passes through the perforated bottom C into the receiving-chamber $a$. During the process the mass of ground coffee is so swelled that it automatically presses itself between the bottom C and diaphragm D with sufficient force to squeeze out all the decoction into the receiving-chamber $a$, and hence the usual waste which takes place by a large amount of the decoction remaining in the grounds is avoided.

I claim as my invention—

In combination with a decocting-chamber having bearings $g\ g$ and perforated loose bottom C, the perforated diaphragm D, having a tube, G, the diaphragm being held in place by means of the screw-rod H and rigid bar I, substantially as and for the purpose set forth.

JOHN HARTMAN, JR.

Witnesses:
 THOMAS J. BEWLEY,
 STEPHEN USTICK.